United States Patent [19]
Kott

[11] 3,800,207
[45] Mar. 26, 1974

[54] ALARM SYSTEM HAVING A RECHARGEABLE POWER PACK

[75] Inventor: Herbert Kott, Riveredge, N.J.
[73] Assignee: Perma Pack, Inc., New York, N.Y.
[22] Filed: Jan. 24, 1972
[21] Appl. No.: 220,006

[52] U.S. Cl............... 320/13, 320/9, 320/48, 340/249, 340/256
[51] Int. Cl............... H02j 7/04, G08b 21/00
[58] Field of Search............... 320/5, 9–14, 320/29, 43, 48, 53, 54; 340/249, 256

[56] References Cited
UNITED STATES PATENTS
| | | | |
|---|---|---|---|
| 3,526,822 | 9/1970 | Dickfelot | 320/14 |
| 3,474,296 | 10/1969 | Rickey | 320/40 X |
| 2,543,314 | 2/1951 | Dodd | 320/24 |
| 3,242,411 | 3/1966 | Lilienfeld | 320/43 |

*Primary Examiner*—J. D. Miller
*Assistant Examiner*—Robert J. Hickey
*Attorney, Agent, or Firm*—Kirschstein, Kirschstein, Ottinger & Frank

[57] ABSTRACT

A rechargeable power supply for use in alarm systems such as burglar alarm systems. The supply includes a battery, means for providing a charging current to the battery, and a signal translating device. The signal translating device electrically couples the charging means to the battery in a pulsating manner until it charges to a specified minimum voltage and then electrically couples the charging means to the battery in a continuous manner until it charges toward full capacity. The signal translating device also electrically couples the battery to an output load terminal of the power supply when a load is being drawn by the power supply until the battery discharges below the minimum specified voltage. When the battery discharges below the minimum specified voltage the signal translating device disconnects the battery from the output load terminal and the charging means until the load is removed from the output load terminal.

7 Claims, 1 Drawing Figure

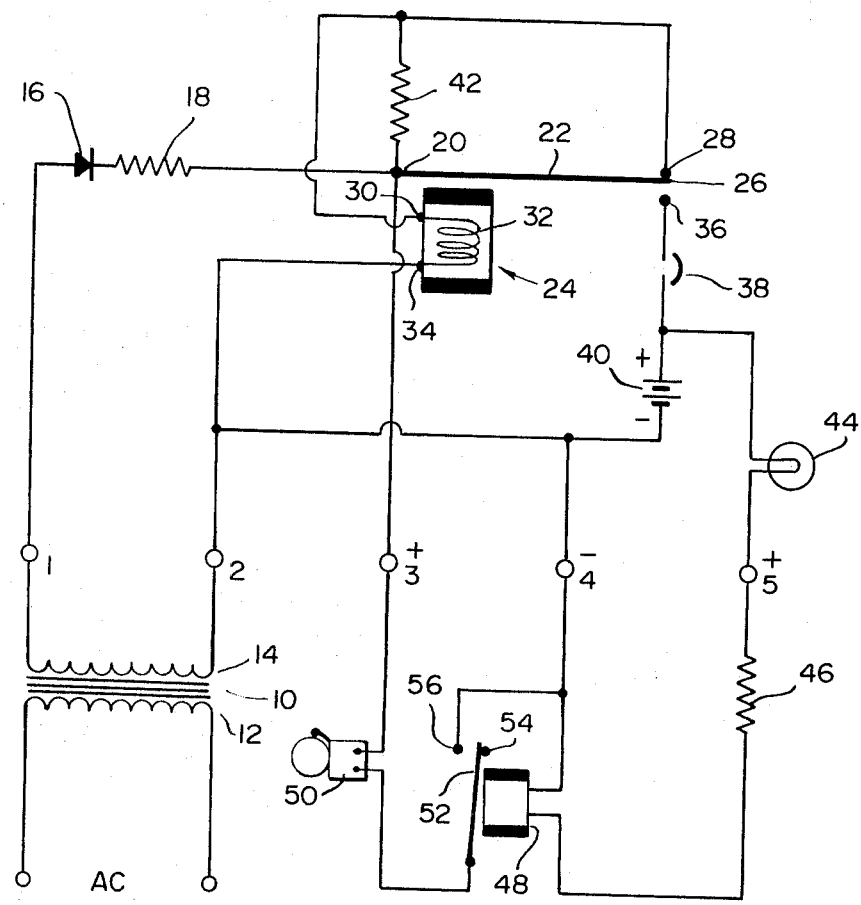

ALARM SYSTEM HAVING A RECHARGEABLE POWER PACK

BACKGROUND OF THE INVENTION

1. Field of the Invention

This invention relates to rechargeable power supplies and more particularly to alarm systems and burglar alarm systems having rechargeable power supplies.

2. Description of the Prior Art

Generally alarm systems, such as burglar alarm systems, must be operated by a reliable source of power. The source of power is usually provided by power packs containing batteries. The power pack should be as simple as possible and have few parts so as not to require continuous maintenance. Furthermore, if the alarm system is set off the battery will drain down. If nickel cadmium cells are used and the battery drain continues beyond a minimum specified voltage value, the polarity of some of the nickel cadmium cells may reverse, thus destroying the usefulness of the battery. Still further, once the battery has discharged, its usefulness is impaired unless it can be easily recharged.

SUMMARY OF THE INVENTION

1. Purposes of the Invention

It is therefore an object of this invention to provide a simple inexpensive power supply having a minimum of components and also requiring a minimum of maintenance.

It is a further object of this invention to provide a power supply for an alarm system or burglar alarm system which is rechargeable.

It is a still further object of this invention to provide a power supply for an alarm system or burglar alarm system wherein a battery within the power supply is protected against excessive current drain.

Other objects of the invention will in part be obvious and in part be pointed out hereinafter.

BRIEF DESCRIPTION OF THE INVENTION

According to a broad aspect of the invention there is provided a rechargeable power supply for use in an alarm system such as burglar alarm system. A rectified d.c. charging current is supplied from an a.c. source. The charging current recharges a battery through a relay contact in a pulsating manner until the battery voltage increases to a specified value, wherein a relay associated with the above relay contact, which was intermittently energized, now becomes continuously energized. The battery thereafter continues to charge in a continuous manner. The battery discharges through the relay contact when a load is connected to an output terminal of the power supply. When the battery discharges to below the specified value, the relay deenergizes and the associated relay contact disconnects the battery from the load. As soon as the load is removed, the battery again begins to recharge through the associated relay contact in the manner described above.

BRIEF DESCRIPTION OF THE DRAWINGS

In the accompanying drawing, in which is shown a possible embodiment of my invention, there is shown a schematic diagram of a rechargeable power supply used in an alarm system.

DESCRIPTION OF THE PREFERRED EMBODIMENT

Referring to the drawing, a conventional step-down transformer 10 is shown having its primary winding 12 connected to the a.c. line and its secondary winding 14 connected across input terminals 1 and 2 of the rechargeable power supply. Terminal 1 is connected to the anode of a rectifier 16. The cathode of rectifier 16 is connected to one terminal of a current limiting resistor 18. The other terminal of resistor 18 is connected to one end 20 of a relay contact 22 of a relay 24. When relay 24 is deenergized, the other end 26 of relay contact 22 is electrically connected to a contact terminal 28. Contact terminal 28 is directly electrically connected to one end 30 of a relay winding 32 of a relay 24. The other end 34 of relay winding 30 is electrically connected to terminal 2 of the power supply.

The a.c. voltage across the secondary 14 of transformer 10, which in this instance may be 7½ volts, is thus rectified by rectifier 16 so that a d.c. current flows from terminal 1 of the power supply through rectifier 16, resistor 18, relay contact 22, relay winding 32 and back to terminal 2 of the power supply. The resistance value of resistor 18 is so selected to allow sufficient energizing current (for example approximately 10 to 15 m.a.) to flow through relay winding 32 so as to energize relay 24. When relay 24 becomes energized, its associated relay contact 22 makes electrical contact with a contact terminal 36 and the current flowing through resistor 18 and contact 22, now flows through contact terminal 36, a circuit breaker 38, to the positive terminal of a battery 40, which battery can be a series of nickel cadmium or lead acid cells. Since end 26 of relay contact 22 is disconnected from contact terminal 28 when it is electrically connected to contact terminal 36, current no longer flows from relay contact 22 through contact terminal 28 and relay winding 32. Therefore, in order for relay 24 to remain energized, a sufficient holding current (for example 2 to 3 m.a.) must flow from resistor 18 through a resistor 42 and winding 32. However, since end 20 of relay contact 22 is effectively clamped to the voltage of battery 40, sufficient holding current will not pass through resistor 42 and relay winding 32 unless the voltage across battery 40 has attained a minimum specififed value. Resistor 42 can be selected to determine this minimum battery voltage, which battery voltage is equal to $V_{min} = (R_s + R_c)(I_h)$, where $R_s$ is the resistance of resistor 42; $R_c$ is the resistance of relay winding 32; and $I_h$ is the minimum holding current required to keep relay 24 energized.

Therefore, if charging current is flowing to battery 40 at a time when the voltage across battery 40 is less than $V_{min}$, the holding current flowing through resistor 42 and winding 32 of relay 24 will be insufficient to keep relay 24 energized. As a result relay 24 will deenergize and relay contact 22 will disengage from contact terminal 36 and make contact with contact terminal 28 so that the charging of the battery 40 is interrupted. Once relay contact 22 engages contact terminal 28, current again directly flows from relay contact 22 through contact terminal 28 and then directly through relay winding 32 so as to again reenergize relay 34. Once relay 24 is again energized, relay contact 22 makes contact with contact terminal 36, and battery 40 again begins to recharge. If insufficient holding current is again flowing through relay coil 32, relay 24 deenergizes and the charging of battery 40 is again interrupted. Battery 40 thus charges in a pulsating manner until its voltage is at least equal to or exceeds $V_{min}$. Once battery 40 is charged to $V_{min}$, sufficient holding current flows through resistor 42 and relay coil 32 from resistor 18 to keep relay 24 energized, and battery 40 then charges continuously through relay contact 22 and contact terminal 36 to maximum capacity.

End 20 of relay contact 22 is electrically connected to an output terminal 3 of the power supply, and the negative terminal of battery 40 is electrically connected to output terminal 4 of the power supply. In this instance, terminal 3 is the positive output terminal and terminal 4 is the negative output terminal, wherein a load can be connected between output terminals 3 and 4. Output terminal 2 in this instance is also electrically connected to output terminal 4. The positive terminal of battery 40 can also be electrically connected to an output terminal 5 of the power supply via an incandescent lamp 44, wherein output terminal 5 is an alternate positive output terminal for the power supply and a load can also be connected between output terminals 4 and 5 of the power supply.

When a load is placed across output terminals 3 and 4 of the power supply, current flows from battery 40 through circuit breaker 38, contact terminal 36, relay contact 22, output terminal 3, the output load and back to the negative terminal of battery 40 via terminal 4 of the power supply. As battery 40 begins to discharge, the voltage across the battery begins to decrease. Once the voltage across battery 40 decreases below $V_{min}$, relay 24 deenergizes for reasons explained above, and relay contact 22 disengages from contact 36 and engages contact 28 so as to disconnect battery 40 from the load. If the load across terminals 3 and 4 is great enough that most of the current flowing through resistor 18 flows through the load so that the current flowing through coil 32 falls to less than the required holding current, then relay 24 becomes deenergized. Relay 24 will remain deenergized and battery 40 will remain permanently disconnected from terminal 3 until the load is removed from power supply terminals 3 and 4. Once the load has been removed from terminals 3 and 4, battery 40 will again recharge in a pulsating manner until the voltage across battery 40 equals or exceeds $V_{min}$ and then the battery will continue to charge as described previously.

Circuit breaker 38, in this instance, is an automatically resetting bimetallic switch, which will open up when a current within a specified range flows therethrough so as to disconnect the battery from the load, and will close again upon cooling. Thus, in this example, if the bimetallic switch were operable when sensing a current of from 3 to 6 amps, upon the application of a 3 to 6 amp load across power supply terminals 3 and 4, the circuit breaker would open up so as to disconnect battery 40 from the load. If a load exceeding 6 amps were applied across terminals 3 and 4 of the power supply, bimetallic switch 38 would burn out. However, under these circumstances, the voltage across battery 40 rapidly decreases below $V_{min}$ so as to deenergize relay 24 and disconnect the battery from the load quickly enough to prevent bimetallic switch 38 from burning out. Thus, in this manner, this unique circuit also protects the bimetallic switch from burning out under exceedingly excessive load conditions.

When the rechargeable power supply is used in an alarm system, such as a burglar alarm system, separate loads are applied across terminals 3 and 4 and terminals 5 and 4 of the power supply. The burlgar alarm system generally has what is known as a protective loop circuit, containing light activated devices and/or metal foil strips, which is represented by an equivalent resistor 46 having one terminal connected in series with output terminal 5. The other terminal of resistor 46 is connected to one terminal of a coil of a relay 48 and the other terminal of the coil of relay 48 is connected to terminal 4 of the power supply. Meanwhile, one terminal of a bell circuit 50 is connected to output terminal 3 of the power supply, and the other terminal of bell circuit 50 is connected to a moveable contact 52 of relay 48. While the protective loop circuit represented by resistor 46 is closed and continues to draw current, relay 48 remains energized and its associated relay contact 52 is electrically connected to a contact terminal 54 so as to prevent current from flowing through bell circuit 50. If the protective loop circuit is broken, current no longer flows through relay 48, and its associated relay contact 52 makes electrical contact with a terminal 56, which terminal is electrically connected to terminal 4 of the power supply, so that current flows from terminal 3 of the power supply through the bell circuit 50 to terminal 4 of the power supply, thus activating the alarm. It should be of course understood that bell circuit 50 can be a standard purchasable off-the-shelf item.

Another feature of this invention is provided by incandescent lamp 44. Incandescent lamp 44 can act as a current limiter by not passing more than for example 40 m.a. of current. If there is a short circuit in the protective circuit, no more than 40 m.a. will be drawn from the battery and the incandescent lamp will be lit, thus providing a warning that there is a failure in the protective loop circuit. Furthermore, if the protective loop circuit were so designed to draw no more than 10 m.a., and approximately 20 m.a. starts the flow through the incandescent lamp so that some light is emitted by the lamp, the lamp is thus again providing an indication that there is some failure in the protective loop circuit.

While the power supply has been described with reference to an alarm system, and more particularly to a burglar alarm system, it of course should be understood that this power supply could also be generally used in other applications.

It thus is seen that there is provided an alarm system having a rechargeable power pack which achieves the several objects of the invention and is well adapted to meet the conditions of practical use.

As various possible embodiments might be made of the above invention, and as various changes might be made in the embodiments above set forth, it is to be understood that all matter herein described, or shown in the accompanying drawings, is to be interpreted as illustrative and not in a limiting sense.

Having now described the invention, there is claimed as new and is desired to be secured by letters patent:

1. A burglar alarm system including a protective loop circuit, an alarm circuit, means for detecting a break in said protective loop circuit and triggering said alarm circuit, and a rechargeable power supply electrically coupled to said alarm circuit and said protective loop circuit, said rechargeable power supply comprising:

a battery;
at least one output load terminal;
means for supplying a d.c. charging current to said battery; and
a signal translating device for electrically coupling said current charging means to said battery in a pulsating manner while said battery is charging to a minimum specified voltage, and for electrically coupling said charging means to said battery in a continuous manner after said battery has charged to the specified minimum voltage, said signal translating device electrically coupling said battery to said one output load terminal, said alarm circuit being connected to said one output load terminal until said battery discharges to below the specified minimum voltage, whereupon said signal translating device disconnects said battery from said one load terminal and said charging means until the alarm circuit is removed from said one output load terminal.

2. An alarm system including a rechargeable power supply comprising: a battery, at least one output load terminal, a circuit connecting the battery to the output load terminal, means for supplying a d.c. charging current to said battery, and a signal translating device including: voltage sensitive switch means having two conditions in a first of which it completes the circuit connecting the battery to the output load terminal and in the second of which it breaks said circuit, and means responsive to the prevailing voltage of the battery for rendering said first condition of said switch means operative when the voltage of the battery is at least equal to a specified minimum voltage and for rendering said second condition of said switch means operative when the battery voltage is below the specified minimum voltage, said alarm system further including an alarm circuit, means for triggering said alarm circuit, said alarm circuit constituting a load and being connected to said one output load terminal, said triggering means being connected to the battery terminals.

3. An alarm system as set forth in claim 2 wherein the alarm circuit includes a bell alarm.

4. An alarm system as set forth in claim 2 wherein the alarm circuit is normally open and wherein the triggering means includes means energizable upon an intrusion to close the alarm circuit.

5. An alarm system as set forth in claim 4 wherein the triggering means is a protective loop circuit and the alarm circuit closing means is a relay in the protective loop circuit having a blade and a pair of contacts, said blade resting against one of the contacts when the triggering means does not detect an intrusion and against the other contact when the triggering means detects an intrusion, said blade and other contact being included in the alarm circuit.

6. An alarm system as set forth in claim 2 wherein a second circuit means is provided, including the signal translating device, said second circuit means connecting the battery to the means for supplying a d.c. charging current when the switch means is in its first condition and said second circuit means being opened when the switch means is in its second condition.

7. An alarm system as set forth in claim 6 wherein a third circuit means is provided, said third circuit means actuating the signal translating device from the means for supplying a d.c. charging current when the switch means is in its second condition so as to shift the switch means from its second condition to its first condition and at the same time to open the third circuit means so that the switch means will revert to its second condition unless the battery voltage is at least equal to the specified minimum voltage.

* * * * *